US009231748B1

(12) United States Patent
Wurtenberger et al.

(10) Patent No.: US 9,231,748 B1
(45) Date of Patent: Jan. 5, 2016

(54) FREQUENCY CHANNEL ASSIGNMENT BASED ON SPEED

(71) Applicant: Sprint Spectrum L.P., Overland Park, KS (US)

(72) Inventors: Andrew M. Wurtenberger, Olathe, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 14/053,214

(22) Filed: Oct. 14, 2013

(51) Int. Cl.
*H04W 74/00* (2009.01)
*H04L 5/00* (2006.01)

(52) U.S. Cl.
CPC .................................. *H04L 5/0069* (2013.01)

(58) Field of Classification Search
CPC ..... H04W 36/30; H04W 36/32; H04W 36/34; H04W 64/00; H04W 88/08; H04W 80/04
USPC ............. 455/435.1, 435.2, 456.1, 404.2, 420, 455/422.1, 436, 441, 444, 550.1, 437, 440, 455/561; 370/328, 338, 331, 329
See application file for complete search history.

(56) References Cited

U.S. PATENT DOCUMENTS

| | | | |
|---|---|---|---|
| 8,457,633 B1* | 6/2013 | Oroskar .................... | 455/435.2 |
| 8,473,006 B1* | 6/2013 | Halferty et al. ............... | 455/557 |
| 8,547,939 B1 | 10/2013 | Vargantwar | |
| 2002/0102976 A1* | 8/2002 | Newbury et al. .............. | 455/436 |
| 2004/0029588 A1* | 2/2004 | Kikuma et al. ............... | 455/436 |
| 2005/0020203 A1* | 1/2005 | Losh et al. .................... | 455/11.1 |
| 2007/0086379 A1* | 4/2007 | Takayanagi et al. .......... | 370/329 |
| 2008/0189970 A1* | 8/2008 | Wang et al. ..................... | 33/701 |
| 2011/0034177 A1* | 2/2011 | Oh et al. ........................ | 455/450 |
| 2011/0170519 A1* | 7/2011 | Zhang et al. .................. | 370/331 |
| 2012/0021792 A1* | 1/2012 | Shen et al. .................... | 455/509 |
| 2012/0122515 A1* | 5/2012 | Han et al. ...................... | 455/525 |
| 2013/0084870 A1* | 4/2013 | Nylander et al. ............. | 455/436 |
| 2013/0295931 A1* | 11/2013 | Yu et al. ..................... | 455/435.1 |
| 2014/0066074 A1* | 3/2014 | Folke et al. ................... | 455/437 |
| 2014/0213267 A1* | 7/2014 | Chai et al. ..................... | 455/450 |

OTHER PUBLICATIONS

Pending U.S. Appl. No. 13/168,568, titled "Interband Traffic Management in a Multi-band Wireless Network," first named inventor: Wurtenberger, Confirmation No. 1292.

* cited by examiner

Primary Examiner — Babar Sarwar

(57) ABSTRACT

A method and corresponding system is provided to help mitigate the potential quality-of-service degradation associated with fast-moving UEs operating in a network that provides higher-bandwidth frequency channels in some but not all wireless coverage sectors. In accordance with the method, a base station may evaluate a UE's current speed and, when that speed exceeds a threshold speed, the base station may instruct the UE to register on a low-bandwidth channel rather than a higher-bandwidth channel. Registering for service on a low-bandwidth channel instead of a higher-bandwidth channel may help ensure that the UE maintains a consistent quality of service as the UE moves from coverage area to coverage area. Further, the base station may also query nearby base stations to determine whether there exists a sufficient number of base stations that operate on higher-bandwidth channels. If so, the base station may instruct the UE to use a higher-bandwidth channel.

20 Claims, 9 Drawing Sheets

FREQUENCY CHANNEL ASSIGNMENT BASED ON SPEED

BACKGROUND

In typical cellular wireless communication systems, wireless communication devices (e.g., cell phones, personal digital assistants, laptops, netbooks, tablets, and/or other wirelessly equipped devices, any of which may be referred to as a user equipment device (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Generally, wireless communications between a given UE and a serving base station in a RAN are carried out in accordance with one or more air interface protocols such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1×RTT and 1×EV-DO), GSM, GPRS, UMTS, EDGE, DEN, TDMA, AMPS, MMDS, WIFI, and BLUETOOTH, or others now known or later developed. Through each base station (and corresponding RAN), a UE can obtain connectivity to other networks such as the public switched telephone network (PTSN) and the Internet. In addition to base stations, each RAN may include one or more radio network controllers (RNCs), or the like, which may be integrated with or otherwise in communication with the base stations, and which may include or be in communication with a switch or gateway that provides connectivity with one or more transport networks. Conveniently with this arrangement, a UE that is positioned within coverage of the RAN may communicate with a base station and in turn, via the base station, with other served devices or with other entities on the transport network.

In general, each base station in a RAN may be configured to operate on one or more frequency bands and, in each such band, to provide service on one or more frequency channels. Example frequency bands, each defining a particular range of radio frequency spectrum, include the 800 MHz band, the 1.9 GHz band, and the 2.5 GHz band. Each frequency channel within a band may then be arranged as a specific block of frequency, such as a 1.25 MHz block, a 5 MHz block, a 10 MHz block, or the like. Further, in certain systems, each frequency channel may include one block of frequency for downlink communications from the RAN to UEs and a corresponding but separate block of frequency for uplink communications from UEs to the RAN. Whereas, in other systems, each frequency channel may be divided over time to separately carry downlink and uplink communications.

To enable UEs to select coverage areas in which to operate, each base station may also be configured to broadcast a specification of the one or more frequency channels on which it operates and to broadcast on each such frequency channel one or more pilot or reference signals that UEs are configured to monitor in order to evaluate coverage strength (e.g., signal strength and/or signal to noise ratio). For example, in a representative LTE system, each base station broadcasts on each of its one or more frequency channels a system information block (SIB) message that lists the frequency channels on which the base station provides service, and each base station further broadcasts on each listed frequency channel a reference signal that LTE-compliant UEs are arranged to monitor in order to evaluate LTE coverage provided by the base station. Similarly, in a representative CDMA system, each base station broadcasts on each of its one or more frequency channels a channel list message (CLM) that lists the frequency channels on which the base station provides service, and each base station further broadcasts on each listed frequency channel a pilot signal that CDMA-compliant UEs are arranged to monitor in order to evaluate CDMA coverage provided by the base station.

When a UE first enters into coverage of a RAN, the UE may automatically scan the airwaves in an effort to find the strongest available coverage, and the UE may then register with the RAN. For instance, the UE may generally scan through various frequency channels and evaluate any reference signals on those frequency channels, and the UE may determine which reference signal is the strongest, thereby identifying an optimal frequency channel and base station coverage area. The UE may then engage in registration signaling with the RAN on that frequency channel in that base station coverage area, to register with the RAN.

Once a UE is registered with a RAN in a particular coverage area, the UE may then be served by the RAN in that coverage area in an "idle" mode in which the UE regularly scans for page messages and other overhead information from the RAN. Further, the UE may engage in additional signaling with the RAN in order to be served by the RAN in an "active" or "connected" mode in which the UE may then engage in bearer communication, such as voice and/or packet-data communication with other entities as discussed above.

OVERVIEW

As explained above, each base station of a RAN may provide wireless service to subscriber UEs on one or more frequency channels. Generally, every base station in the RAN offers at least one low-bandwidth channel (e.g., a 1.25 MHz channel). However, in some implementations, some base stations may offer additional, higher-bandwidth channels (e.g., a 5 MHz channel and/or a 10 MHz channel). In practice, these higher-bandwidth channels are typically offered in some, but not all, sectors of a RAN. As a general matter, when UEs operate on frequency channels with higher bandwidths (e.g., 5 MHz channels or 10 MHz channels), these UEs tend to receive a better quality of service than UEs operating on low-bandwidth channels (e.g., a 1.25 MHz channel) because the higher-bandwidth channels allow for higher throughput. Consequently, UEs may be programmed to prefer these higher-bandwidth channels when they are available.

However, providing higher-bandwidth channels in some but not all sectors of a RAN may result in a potentially problematic situation for UEs that are particularly mobile. For instance, a UE moving with high speed will likely move in and out of coverage of several sectors within a short period of time. If, in one of those sectors, the UE detects and registers for service on a higher-bandwidth channel, it is likely that the UE will soon leave coverage of that sector, and thus leave coverage of the higher-bandwidth channel. Further, it may be the case that the next sector entered into by the UE does not offer higher-bandwidth channels, and thus, the UE will detect and register for service on a low-bandwidth channel. As explained above, higher-bandwidth channels tend to provide better quality of service; thus, changing from a higher-bandwidth channel to a low-bandwidth channel may result in a diminishing quality of service and, in turn, a poor user experience.

To address this situation, and perhaps others, disclosed herein is a method that helps mitigate the potential quality-of-service degradation associated with fast-moving UEs. In accordance with the method, a base station may evaluate a UE's current speed and, when that speed exceeds a threshold speed, the base station may instruct the UE to register on a low-bandwidth channel rather than a higher-bandwidth channel. Registering for service on a low-bandwidth channel instead of a higher-bandwidth channel may help ensure that the UE maintains a consistent quality of service as the UE moves from coverage area to coverage area.

In some embodiments of the method, the base station may determine a distance within which to query other base stations to determine what frequency channels those other base stations offer. Based on this query, the base station may determine whether there are greater than a threshold number of other base stations that offer higher-bandwidth channels. If there are fewer than the threshold number of other base stations that offer higher-bandwidth channels within the determined distance, the base station may instruct the UE to use a low-bandwidth channel rather than a higher-bandwidth channel. On the other hand, if there are greater than the threshold number of other base stations that offer higher-bandwidth channels within the determined distance, the base station may instruct the UE to use a higher-bandwidth channel even though the base station may have determined that the UE's speed exceeds a threshold speed. Allowing the UE to register on the higher-bandwidth channel in this situation may be acceptable because there may be a sufficient number of nearby base stations offering the higher-bandwidth channel so that the UE may maintain a consistent quality of service as the UE moves from coverage area to coverage area.

In embodiments of the method in which the base station offers three or more channels of differing bandwidth, the base station may evaluate a UE's speed and compare it against a particular threshold speed for each frequency channel to determine which frequency channel to instruct the UE to use. For instance, in embodiments in which the base station offers three channels of differing bandwidths (e.g., a 1.25 MHz channel, a 5 MHz channel, and a 10 MHz channel), the base station may evaluate the UE's speed and determine whether the speed exceeds a 10 MHz threshold speed (e.g., 15 feet per second) and whether the speed exceeds a 5 MHz threshold speed (e.g., 25 feet per second). The base station may instruct the UE to use the 10 MHz channel when the speed does not exceed the 10 MHz threshold speed, the 5 MHz channel when the speed exceeds the 10 MHz threshold speed but does not exceed the 5 MHz threshold speed, and the 1.25 MHz channel when the speed exceeds both threshold speeds.

Alternatively or additionally, when the base station determines that a UE's speed exceeds a threshold speed, the base station may instruct the UE to register on a frequency channel in a lower frequency band. For instance, as explained above, a base station may provide wireless service on frequency channels in each of multiple different bands (e.g., an 800 MHz band, a 1.9 GHz band, and a 2.5 GHz band). As a general matter, frequency channels of different bands tend to have different propagation characteristics. For instance, frequency channels of higher bands (e.g., the 1.9 GHz band and the 2.5 GHz band) are more susceptible to attenuation by air-interface obstructions than frequency channels in low bands (e.g., the 800 MHz band). As a result of this, frequency channels of the low band tend to propagate farther than frequency channels of higher bands. Thus, when a UE is operating on a frequency channel of a low frequency band, the UE may be able to stay within coverage of the frequency channel for a longer distance, thereby helping to avoid frequent handoffs, than if the UE was operating on a frequency channel of a higher frequency band.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Figure 1:
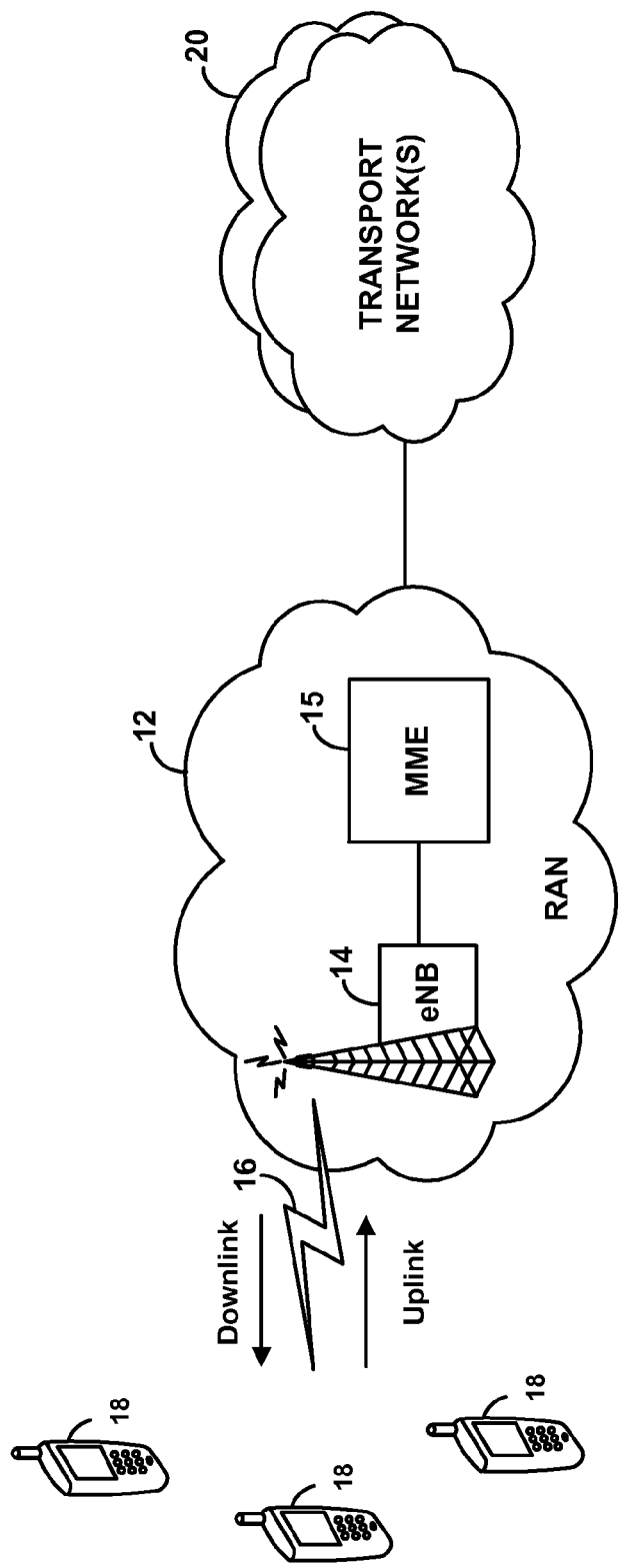
FIG. 1 depicts an example communication system, in which an example embodiment of the described arrangement can be implemented.

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another such non-transitory machine-readable medium.

At a general level, as shown in FIG. 1, the example wireless communications system includes at its core a RAN 12 having an eNodeB (eNB) 14, that radiates to define a wireless air interface 16 through which the eNB may communicate with at least one UE 18. The eNB 14 is in turn shown coupled to a Mobility Management Entity (MME) 16 that typically coordinates bearer setup and the tracking and paging of subscriber UEs operating in the RAN. RAN 12 then provides connectivity with one or more transport networks 20, such as the PSTN or the Internet for instance. With this arrangement, a UE 18 that is positioned within coverage of the base station and that is suitably equipped may engage in air interface communication with the base station and may thereby communicate with remote entities on the transport network(s) 20 and/or with other UEs served by the RAN.

At a more complex level, but still by way of example, the network architecture of RAN 12 may be configured to enable eNB 14 to communicate with UEs 18 over the air interface 16 according to one or more agreed air interface protocols, examples of which include any and all of the protocols described above. For example, in a UMTS system configured to operate according to LTE standards, the base station is usually referred to as an eNodeB or an eNB. In a CDMA system configured to operate according to the IS-2000 standard (sometimes referred to as 1×RTT) or the IS-856 standard (sometimes referred to as 1×EV-DO), the base station is usually referred to as a Base Transceiver Station (BTS) and is usually under the control of a Base Station Controller (BSC). Other architectures and operational configurations of a RAN are possible as well.

As further shown in FIG. 1, the air interface 16 generally defines an uplink that carries wireless communications from the RAN 12 to the UEs 18 and a downlink that carries wireless communications from the UEs 18 to the RAN 12. Depending on the protocol, these links may be structured in various ways. At a high level, for instance, the eNB 14 may provide service on one or more frequency channels and in one or more frequency bands, as described above, with downlink communications occupying one band and uplink communications occupying another band. Alternatively, downlink and uplink communications may be carried out on a common frequency band and may be differentiated through time division multiplexing and/or other techniques.

2. Example Network Device

Figure 2:
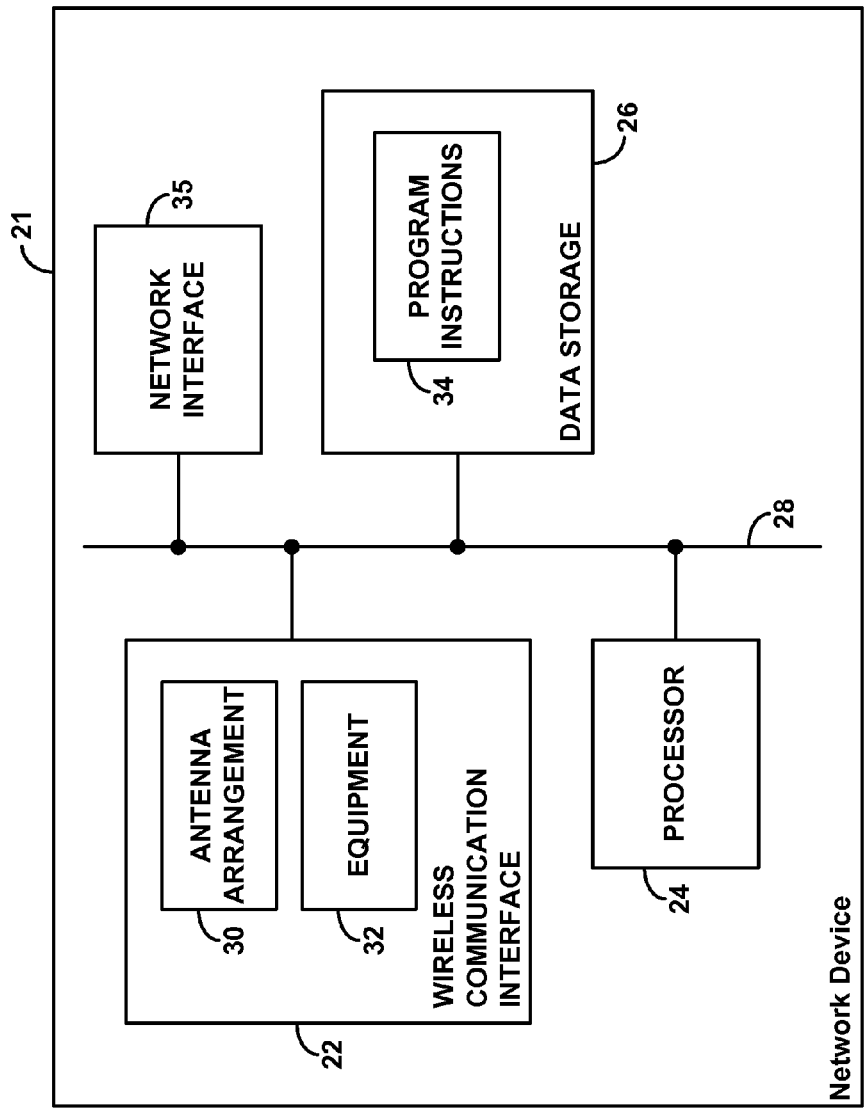
FIG. 2 depicts an example network device arranged to implement the present methods.

FIG. 2 is a simplified block diagram of an example network device 21 that may be configured to carry out network-side functions described herein. Network device 21 may be representative of an eNB (such as eNB 14), BTS, access node, access point, Node-B, femtocell, microcell, picocell, an MME (such as MME 15), or some other entity that may be associated with RAN 12. As shown in FIG. 2, the network device may include a wireless communication interface 22, a processor 24, and data storage 26, all of which may be coupled together by a system bus, network or other connection mechanism 28.

As further shown, wireless communication interface 22 may include an antenna arrangement 30 and associated equipment 32, the combination of which may enable network device 21 to communicate with UEs (or perhaps other network devices) on a network such as RAN 12. For example, wireless communication interface 22 may enable network device 21 to transmit downlink communications to UEs, and receive uplink communication from UEs. Accordingly, the antenna arrangement 30 may be tower mounted and configured to radiate to define one or more wireless coverage sectors in which UE 18 operates. The equipment 32 may include a trunk, optical link, or any Ethernet network interface card or other physical connection that can be coupled with any other entity on the RAN 12 or transport network(s) 20. By way of example, the equipment 32 may include a module, such as an CSM-series chipset made by Qualcomm Inc. of San Diego, Calif., and may support wireless packet-data communications according to a CDMA family of protocols. Other modules that support others communications protocols are possible as well.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components, such as a non-transitory computer-readable medium, and may be integrated in whole or in part with processor 24. Some examples of non-transitory computer-readable media include a hard disk drive, a Compact Disc (CD), a Digital Video Disk (DVD), a digital tape, flash memory, although others are possible.

As shown, network device 21 may also include a network interface 35. Network interface 35 may generally be any wired (e.g., Ethernet) or wireless (e.g., Wi Fi) interface over which the network device can transmit and receive data with another entity. In examples in which the network device 21 is a macro cell base station or an MME, the network interface 35 may be configured to communicate with other macro cell base stations, small cell base stations, other MMEs, and/or other network entities. In examples in which the network device 21 is a small cell base station, the network interface 35 may be configured to communicate with a home router, and thus to the Internet and/or one or more other packet-data networks. The small cell base station may establish via the network interface 35 a virtual-private-network (VPN) connection over the Internet with an entity (e.g., a VPN terminator) on the wireless service provider's core network. In this case, the small cell base station may then securely communicate with the VPN terminator and thereby communicate with other entities on the core network.

As further shown, data storage 26 may hold program instructions 34, which may be executable by processor 24 to carry out various base station or RAN 12 functions described herein. For instance, in accordance with the program instructions 34, the processor 24 may function to determine that a UE's speed exceeds a threshold speed, and in response to the determining, instruct the UE to use a low-bandwidth frequency channel. Additionally, in accordance with the program instructions 34, the processor 24 may also function to receive from one or more other base stations an indication of the frequency channels on which the one or more other base stations operate, based on the indications of the frequency channels on which the one or more other base stations operate, determine that there are greater than a threshold number of other base stations that operate on the first frequency channel, determine that a UE's speed exceeds a threshold speed, and in response to the determining, instruct the UE to use a higher-bandwidth frequency channel even though the base station determined that the UE's speed exceeds a threshold speed.

As such, the processor 24 programmed with instructions 34 may define part or all of a controller for controlling operation of the network device 21. Alternatively or additionally, however, such control functionality could be provided external to the network device 21, such as within some other entity not shown but associated with RAN 12 or transport network(s) 20 in FIG. 1. Such an entity may be communicatively linked with the network device 21 and could serve to control aspects of the network device 21 and RAN operation generally.

3. Example User Equipment

Figure 3:
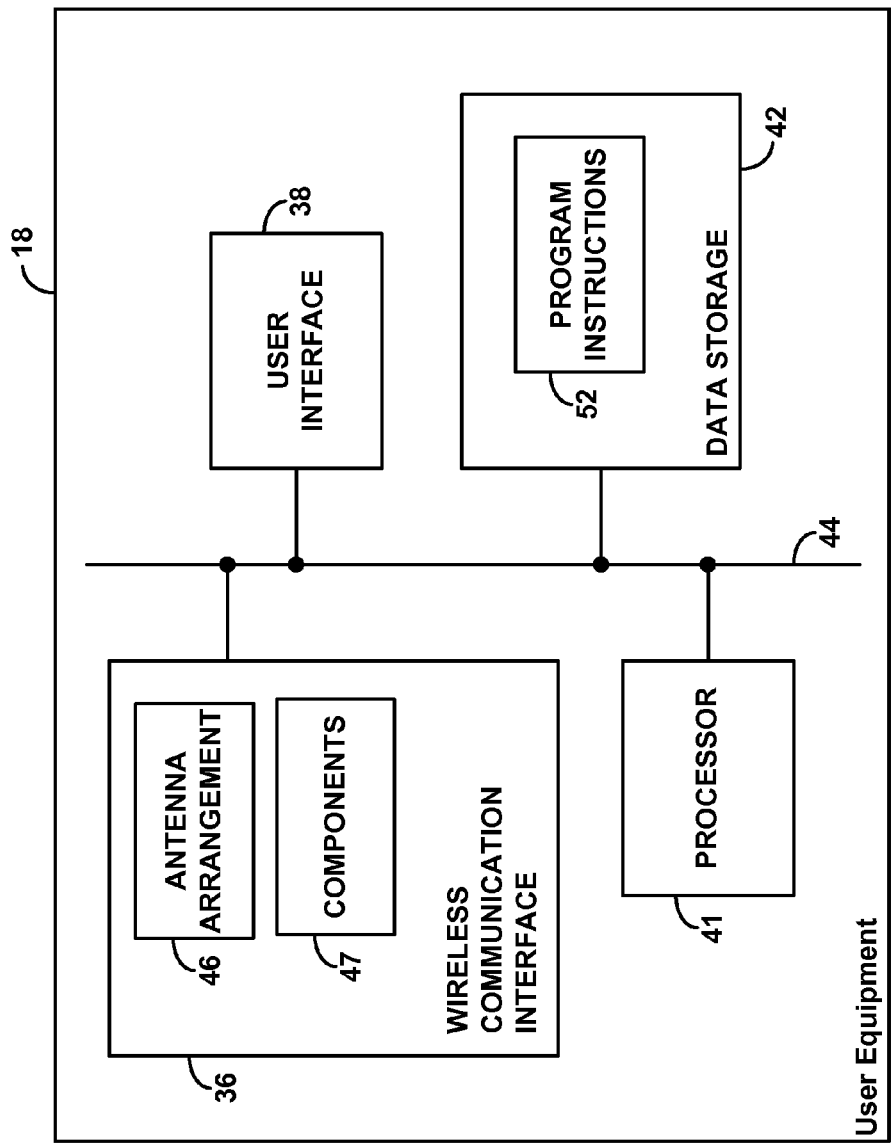
FIG. 3 depicts an example user equipment arranged to implement the present methods.

FIG. 3 is a simplified block diagram of a representative UE 18 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 36, a user interface 38, a processor 41, and data storage 42, all of which may be coupled together by a system bus, network, or other connection mechanism 44.

Wireless communication interface 36 may comprise an antenna arrangement 46 and associated components 47, for engaging in communication with serving base stations, such as to transmit data and control information to the base stations and to receive data and control information from the base stations. For instance, the components 47 may include a mobile station modem, such as an MSM-series chipset made by Qualcomm Inc. However, other modules that support other protocols are possible as well.

User interface 38 may facilitate interaction with a user of the UE if applicable. As such, the user interface may include output components such as a display screen, loudspeaker, and headphone jack, and input components such as a keypad, a touch-sensitive screen, and a camera.

Processor 41 may comprise one or more general purpose processors and/or special-purpose processors and may be integrated in whole or in part with wireless communication interface 36. Data storage 42 may comprise one or more volatile and/or non-volatile storage components, such as a non-transitory computer-readable medium, and may be integrated in whole or in part with processor 41. Some examples of non-transitory computer-readable media include a hard disk drive, a Compact Disc (CD), a Digital Video Disk (DVD), a digital tape, flash memory, although others are possible. As shown, data storage 42 may hold program instructions 52, which may be executable by processor 41 to carry out various UE functions described herein.

4. Example Configuration of Tracking Areas

Figure 4:
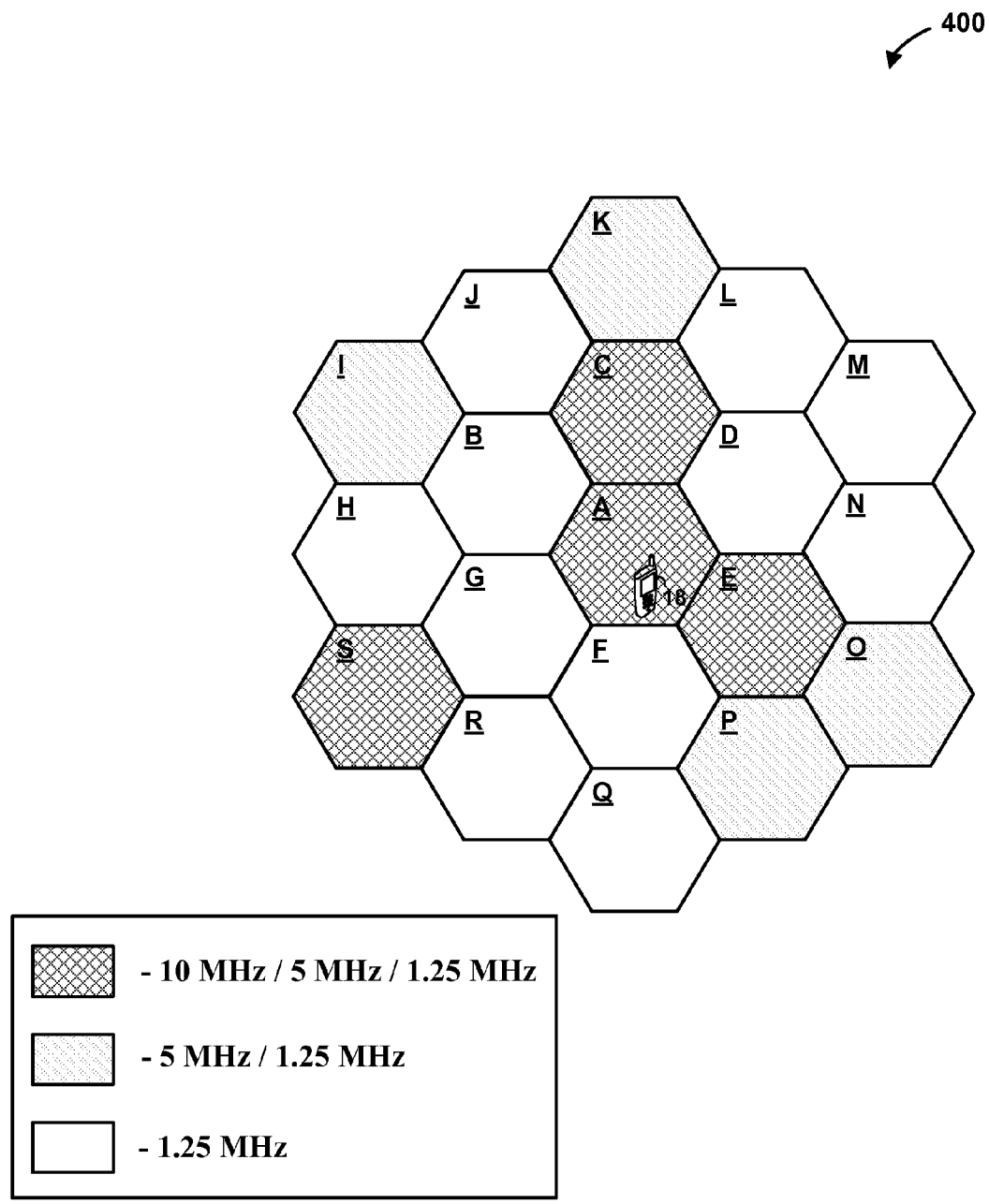
FIG. 4 depicts an example arrangement of tracking areas in which the present methods can be implemented.

FIG. 4 is a block diagram depicting a portion of an example wireless network 400. As shown in FIG. 4, network 400 includes nineteen wireless coverage sectors A-S and a UE 18 that is operating in coverage of sector A. Each sector in network 400 is generally defined by radiation of an antenna arrangement of a respective eNB, BTS, or femtocell, all of which are hereafter referred to as "base station" for brevity. Additionally, each sector A-S is shown as being roughly hexagonal; however, in practice, wireless coverage sectors may be circular, oval, or any other shape.

As further shown in FIG. 4 via various types of patterning, some sectors of wireless network 400 provide wireless service on frequency channels of just one size bandwidth, some sectors provide wireless service on frequency channels of two sizes of bandwidth, and some sectors provide wireless service on frequency channels of three sizes of bandwidth. More specifically, sectors, B, D, E, G, H, J, L, M, Q, and R offer just frequency channels of 1.25 MHz bandwidth, sectors I, K, O, and P offer frequency channels of 1.25 MHz and 5 MHz bandwidths, and sectors A, C, E, and S offer frequency channels of 1.25 MHz, 5 MHz, and 10 MHz bandwidths. In other wireless networks, other configurations of frequency channels are possible as well.

As explained above, a potentially problematic situation may arise when UE 18 is in coverage of a sector that offers higher-bandwidth frequency channels, such as sector A, and UE 18 is moving at a high speed. For instance, while UE 18 is in coverage of sector A, UE 18 may receive from the base station of sector A an SIB message that specifies the frequency channels on which that base station provides service in sector A. The SIB message may list the 10 MHz channel, the 5 MHz channel, and the 1.5 MHz channel. As mentioned above, in accordance with pre-programmed preferences, the UE 18 may engage in registration signaling with the base station to register for service on the 10 MHz channel. However, as a result of UE 18 moving at a high speed, it is likely that the UE will soon enter into coverage of a neighbor sector, such as one of sectors B-G, and shortly thereafter, into yet another neighbor sector, such as one of sectors H-S. As such, it is likely that UE 18 will soon operate in one of the sectors that does not offer higher-bandwidth channels. Thus, when UE 18 moves into one of these sectors that does not offer higher-bandwidth channels, UE 18 may experience a degradation of quality of service when UE 18 registers for service on one of the low-bandwidth channels, such as the 1.25 MHz channel.

In accordance with one method designed to help provide for a more consistent quality of service experience for UEs that are particularly mobile, a base station, such as the base station of sector A may evaluate the speed of UE 18 to determine whether the speed exceeds a threshold speed. When the speed exceeds a threshold speed, the base station may responsively instruct UE 18 to use a low-bandwidth channel, such as the 1.25 MHz channel, even though a higher-bandwidth channel, such as the 10 MHz channel, is available.

The base station of sector A may evaluate the speed of UE 18 in any number of suitable ways. For instance, the UE 18 may transmit an indication of its speed to the base station in a power headroom report or other uplink control message. Further, in order to calculate the speed of UE 18, UE 18 may, with the aid of a GPS module or some other location-determination mechanism, measure the distance between two locations, while simultaneously measuring the amount of time it took to move between the two locations. In one example, UE 18 may determine that it took approximately 15 seconds to move 550 feet. Accordingly, UE 18 may determine that its current speed is about 37 feet per second (about 25 miles per hour). However, other ways to calculate speed are possible as well.

After receiving from UE 18 an indication of the speed of UE 18 (or determining the speed of UE 18 in some other manner) the base station of sector A may determine whether that speed exceeds a threshold speed. In some embodiments, the base station maintains (e.g., in data storage 26) a predetermined threshold speed (e.g., 25 feet per second). In the example given above, the base station may determine that the speed of UE 18 exceeds the threshold speed because 37 feet per second is greater than 25 feet per second. However, in other embodiments, other threshold speeds are possible as well.

In response to determining that the speed of UE 18 exceeds this threshold speed, the base station may instruct UE 18 to use a low-bandwidth channel, such as the 1.25 MHz channel. In one example embodiment, the base station instructs UE 18 to use a particular frequency channel by sending UE 18 a message, such as a frequency assignment message, on an overhead downlink channel. However, other ways of instructing a UE to use a particular frequency channel are possible as well.

In an alternative embodiment, the base station may maintain (e.g., in data storage 26) a predetermined threshold speed for each higher-bandwidth channel on which the base station provides service. In the example network 400 depicted in FIG. 1, the base station of sector A may maintain a threshold speed for the 5 MHz channel (e.g., 25 feet per second) and a threshold speed for the 10 MHz channel (e.g., 15 feet per second). In this example, after evaluating the speed of UE 18, the base station may determine whether the whether the speed exceeds a 10 MHz threshold speed (e.g., 15 feet per second) and whether the speed exceeds a 5 MHz threshold speed (e.g., 25 feet per second). The base station may instruct the UE to use the 10 MHz channel when the speed does not exceed the 10 MHz threshold speed, and the 5 MHz channel when the speed exceeds the 10 MHz threshold speed but does not exceed the 5 MHz threshold speed. If the speed of the UE 18 exceeds both of the threshold speeds, the base station may instruct the UE 18 to use the 1.25 MHz channel. These are just example channel bandwidths and threshold speeds; in other embodiments, other values are possible.

Alternatively or additionally, before instructing UE 18 to use a low-bandwidth channel, the base station of sector A may query some other nearby base stations to determine the frequency channels on which those nearby base stations operate. If a sufficient number of nearby base stations also operate on higher-bandwidth channels, the base station of sector A may allow UE 18 to use a higher-bandwidth channel even though the base station of sector A may have determined that the speed of UE 18 exceeds a threshold speed. Allowing the UE to register on a higher-bandwidth channel here may be acceptable because the UE may be likely to maintain a consistent quality of service as the UE moves from coverage area to coverage area as a result of there being a sufficient number of nearby base stations that also offer higher-bandwidth channels.

In one example of this, the serving base station of UE 18 (e.g., the base station of sector A) utilizes network interface 35 to transmit to any base station within a threshold distance a frequency-channel query. In response to receiving such a query, a nearby base station may refer to data storage to determine what channels the nearby base station offers. The nearby base station may then formulate a suitable message containing indications of the nearby base station's channel bandwidths and utilize a network interface to transmit the message back to the serving base station.

In some embodiments, the threshold distance is a predetermined distance (e.g., 0.5 miles). However, in other embodiments, the base station determines the threshold distance based on the current speed of the UE 18. For instance, if the speed of the UE 18 is between 0 feet per second and 10 feet per second (inclusive), the threshold distance may be 0.25 miles, whereas if the speed of the UE 18 is greater than 10 feet per second, the threshold distance may be 0.5 miles. In other embodiments, other distances and other threshold speeds may be used.

Based on the messages received at the serving base station in response to the frequency-channel queries, the serving base station may determine how many nearby base stations operate on a higher-bandwidth channel and compare that number to a threshold number (e.g., five). If the serving base station determines that there are greater than the threshold number of nearby base stations that offer higher-bandwidth channels, the serving base station may instruct the UE 18 to use the higher-bandwidth channel (e.g., the 10 MHz channel) even though the serving base station may have determined that the speed of the UE 18 exceeds a threshold speed. On the other hand, if the serving base station determines that there are fewer than the threshold number of nearby base stations that offer higher-bandwidth channels, the serving base station may responsively instruct the UE 18 to use a low-bandwidth channel when the serving base station determines that the speed of the UE 18 exceeds the threshold speed.

Figure 5:
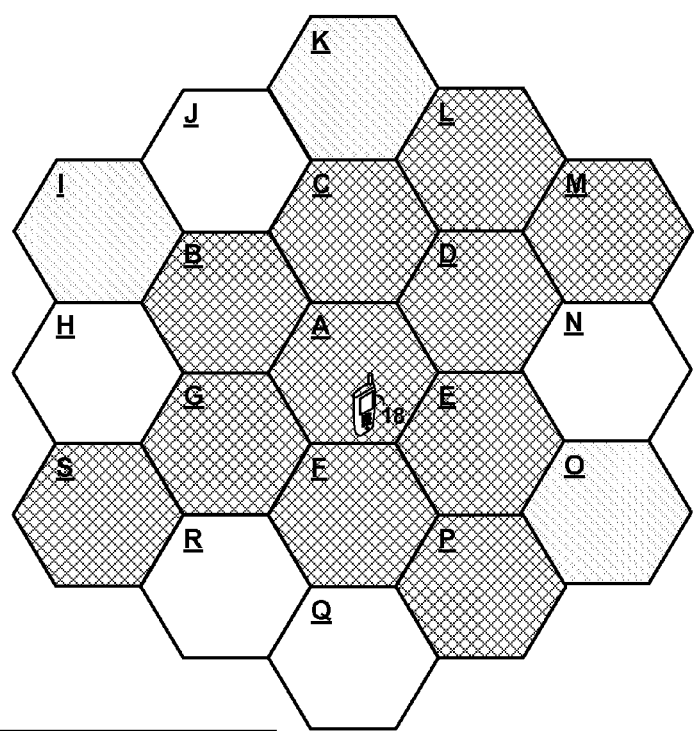
FIG. 5 depicts an example arrangement of tracking areas in which the present methods can be implemented.
Figure 5:
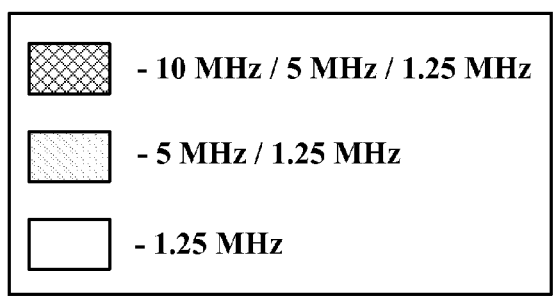

To further illustrate this embodiment, FIG. 5 depicts another network 500, in which the sectors A-S have different frequency channel configurations. More specifically, sectors, H, J, N, Q, and R offer just frequency channels of 1.25 MHz bandwidth, sectors I, K, and O offer frequency channels of 1.25 MHz and 5 MHz bandwidths, and sectors A-G, L, M, P, and S offer frequency channels of 1.25 MHz, 5 MHz, and 10 MHz bandwidths.

In operation according to the above-described embodiment, sector A may transmit a query to base stations within 0.5 miles of the base station of sector A (e.g., the six base stations of sectors B-G). The base stations of these sectors may return response messages indicating that each of them operates on frequency channels of 1.25 MHz, 5 MHz, and 10 MHz bandwidths. The base station of sector A may therefore conclude that there are greater than the threshold number (e.g., five) of nearby base stations that offer higher-bandwidth frequency channels. In response to this conclusion, the base station of sector A may instruct UE 18 to use a low-bandwidth channel when the base station of sector A determines that the speed of UE 18 exceeds the threshold speed.

Figure 6:
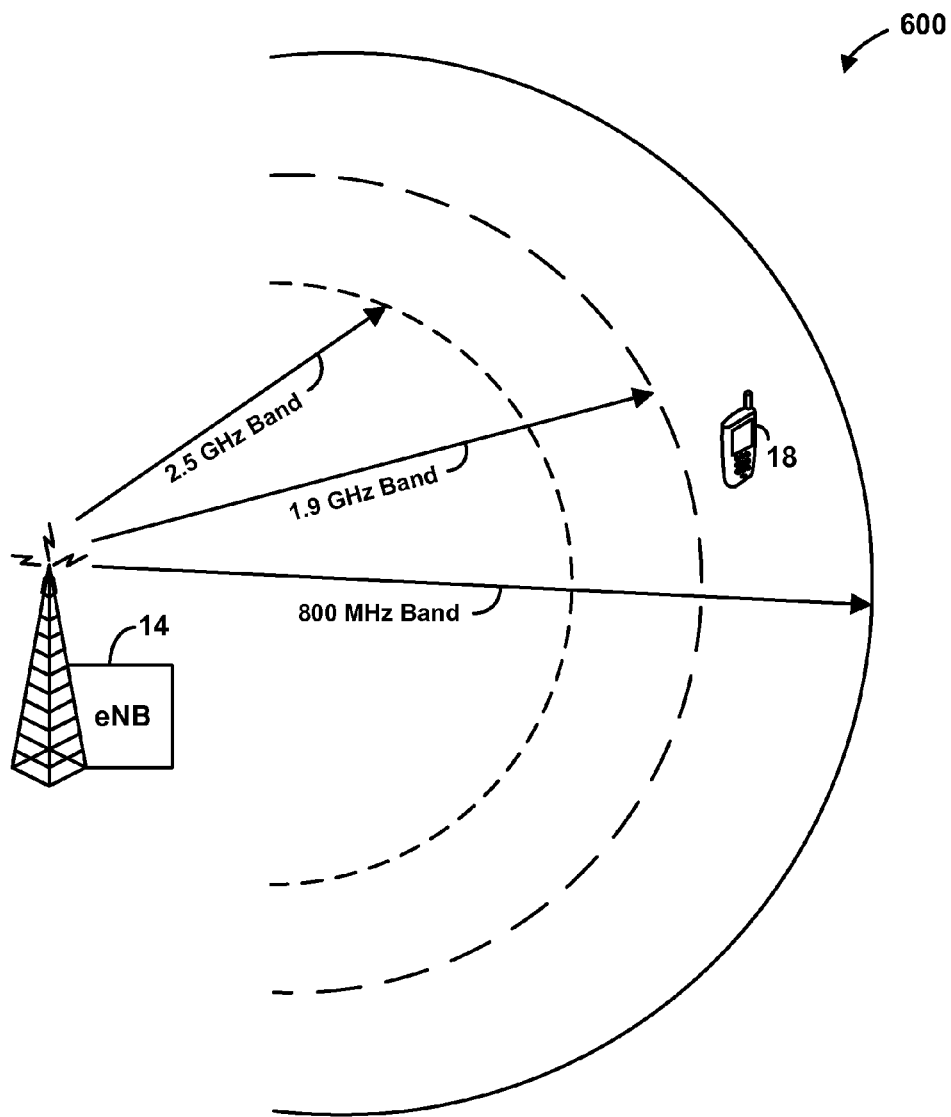
FIG. 6 depicts an example coverage area in which the present methods can be implemented.

In accordance with another embodiment, in response to determining that the speed of the UE 18 exceeds a threshold speed (e.g., 15 feet per second), the serving base station may instruct the UE to use a frequency channel, perhaps even a low-bandwidth frequency channel, in a low frequency band. As mentioned above, the base stations of networks 400 or 500 may provide wireless service on frequency channels in each of multiple different frequency bands (e.g., an 800 MHz band, a 1.9 GHz band, and a 2.5 GHz band). As a general matter, frequency channels of different bands tend to have different propagation characteristics. FIG. 6 depicts example propagation distances of frequency channels in an 800 MHz band, a 1.9 GHz band, and a 2.5 GHz band as radiated by an eNB 14. Frequency channels in other frequency bands are possible in other embodiments.

As depicted, frequency channels of higher bands (e.g., the 1.9 GHz band and the 2.5 GHz band) may not radiate as far as frequency channels of low bands (e.g., the 800 MHz band) because these higher frequency bands tend to be more susceptible to attenuation by air-interface obstructions, such as buildings or trees. Consequently, if UE 18 is operating on a frequency channel of a low frequency band, UE 18 may be able to stay within coverage of the frequency channel of the low frequency band even when UE 18 moves out of coverage of the frequency channels of the higher frequency bands. Thus, when traveling at high speeds, operating on a low-frequency band may help UE 18 to avoid frequent handoffs, and thereby improve user experience.

In practice, the serving base station may instruct UE 18 to use a frequency channel in a particular frequency band by sending UE 18 a message on an overhead downlink channel, for instance, that specifies the frequency channel and the frequency band. In one example, the base station may invoke an inter-frequency handover by transmitting to UE 18 an inter-frequency handover directive that specifies the new frequency band to use. However, other ways of instructing a UE to use a frequency channel in a particular frequency band are possible as well.

Figure 7:
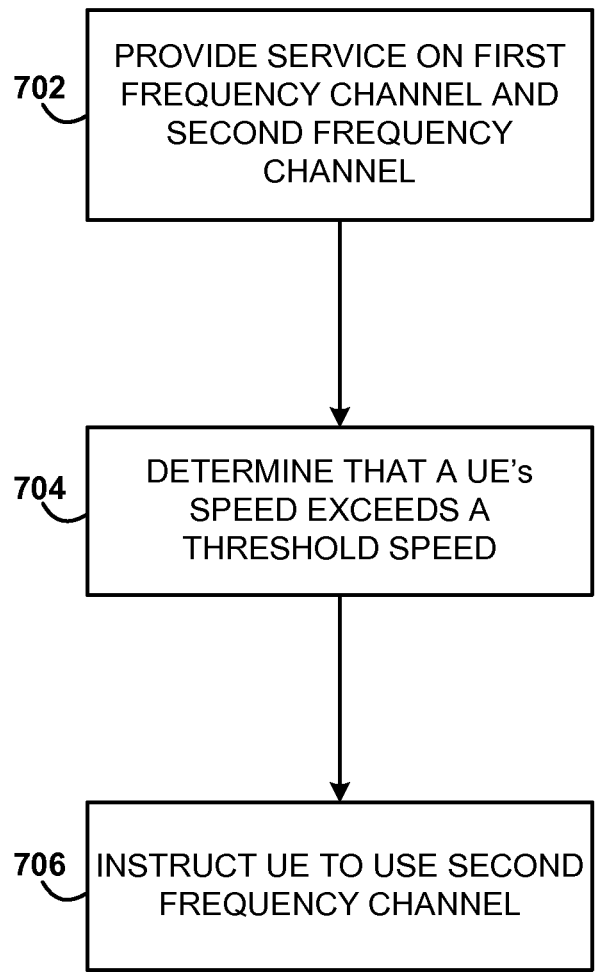
FIG. 7 is a flowchart depicting functions that can be carried out in accordance with the present methods.

FIG. 7 is a flowchart depicting functions that can be carried out by a base station, in accordance with at least one embodiment of the present method. This process begins at block 702 where the base station provides wireless service on a first frequency channel and a second frequency channel. For example, as described above, the first frequency channel may be a 10 MHz block of frequency and the second frequency channel may be 1.25 MHz block of frequency. As such, the second channel has a narrower bandwidth than the first channel. Other frequency channels of other bandwidths are possible as well.

The process continues at block 704, where the base station determines that a UE's speed exceeds a threshold speed. For instance, the base station may receive from the UE an indication of the UE's speed. The base station may then compare that indication to a predetermined threshold speed (e.g., 25 feet per second) to determine whether the indication of the UE's speed exceeds the threshold speed. Other ways of determining whether a UE's speed exceeds a threshold speed are possible as well.

At block 706, the base station, in response to determining that the UE's speed exceeds the threshold speed, the base station instructs the UE to use the second frequency channel, even though the first frequency channel, which has a wider bandwidth, is available. As described above, the base station may transmit to the UE on an overhead downlink channel a frequency assignment message that specifies the second frequency channel. In response to receiving such a message, the UE may engage in registration signaling with the base station in order to register for service on the second frequency channel.

Figure 8:
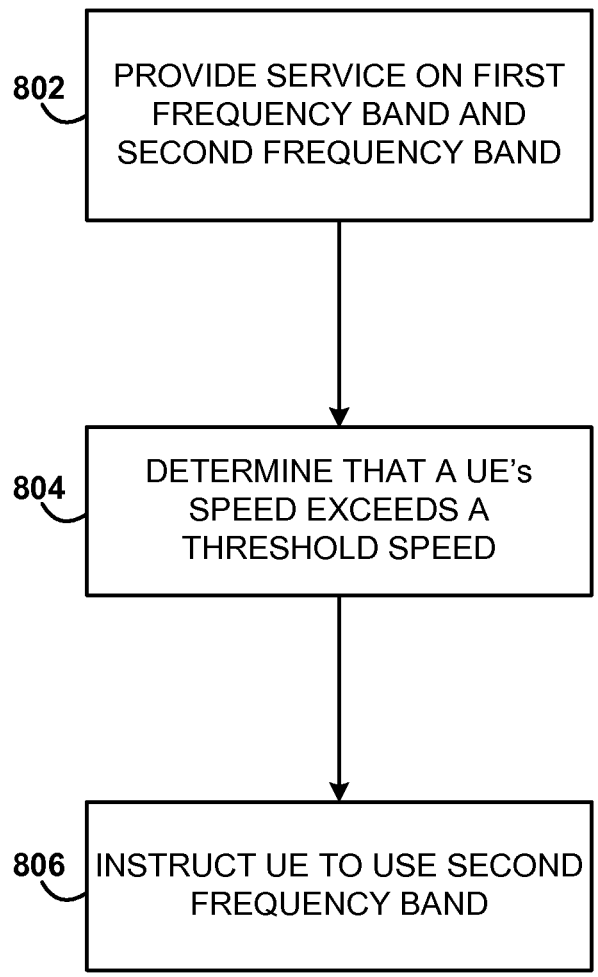
FIG. 8 is a flowchart depicting functions that can be carried out in accordance with the present methods.

FIG. 8 is another flowchart depicting functions that can be carried out by a base station, in accordance with at least one embodiment of the present method. This process begins at block 802 where the base station provides wireless service on frequency channels in a first frequency band and a second frequency band. For example, as described above, the base station may provide service on frequency channels in a 2.5 GHz band and on frequency channels in an 800 MHz band. As such, the 800 MHz band is a lower frequency band then the 2.5 GHz band. Other frequency channels in other frequency bands are possible as well.

The process continues at block 804, where the base station determines that a UE's speed exceeds a threshold speed. For instance, the base station may receive from the UE an indication of the UE's speed. The base station may then compare that indication to a predetermined threshold speed (e.g., 25 feet per second) to determine whether the indication of the UE's speed exceeds the threshold speed. Other ways of determining whether a UE's speed exceeds a threshold speed are possible as well.

At block 806, the base station, in response to determining that the UE's speed exceeds the threshold speed, the base station instructs the UE to use a frequency channel in the second frequency band, even though frequency channels in the first frequency band are available. In one example, the base station may carry this out by invoking an inter-frequency handover and transmitting to UE 18 an inter-frequency handover directive that specifies the new frequency band to use. In some embodiments of the method, the inter-frequency handover directive specifies a low-frequency channel, such as a 1.25 MHz channel, in the second frequency band. In response to receiving such a directive, the UE may engage in registration signaling with the base station in order to register for service on the specified frequency channel in the second frequency band.

Figure 9:
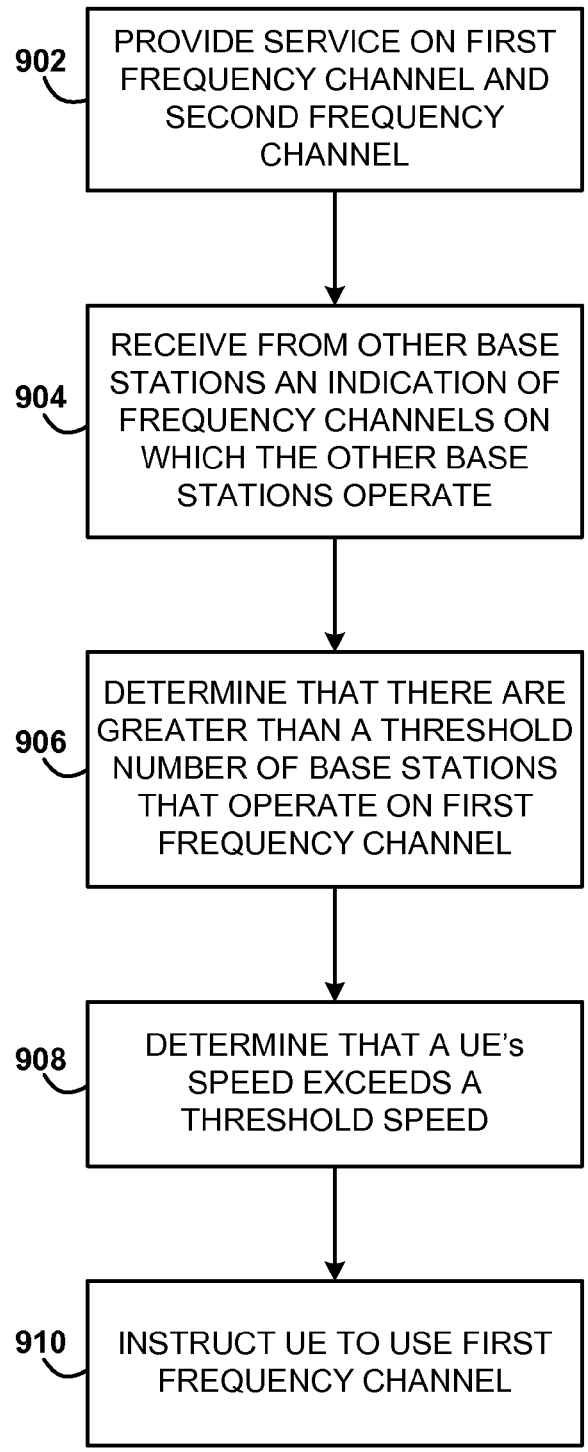
FIG. 9 is a flowchart depicting functions that can be carried out in accordance with the present methods.

FIG. 9 is another flow chart that depicts functions that can be carried out by a base station, in accordance with at least one embodiment of the present method. The process begins at block 902 where a base station provides wireless service on a first frequency channel and a second frequency channel. For example, as described above, the first frequency channel may be a 10 MHz block of frequency and the second frequency channel may be 1.25 MHz block of frequency. As such, the second channel has a narrower bandwidth than the first channel. Other frequency channels of other bandwidths are possible as well.

At block 904, the base station may receive from other nearby base stations an indication of the frequency channels on which the other base stations operate. For instance, the base station may receive such indications in response to transmitting to the other base stations frequency-channel queries. In one example, these indications may reveal that six nearby base stations operate on a higher-bandwidth frequency channel (e.g., a 10 MHz channel). Other examples are possible as well.

At block 906, the base station determines that there are greater than a threshold number of base stations that operate on the first frequency channel. In one example, the threshold number of base stations is five. Thus, based on the indications received in block 904, the base station may determine that there are greater than the threshold number of base stations that operate on the first frequency channel because the base station determined that there are six base stations that operate on the 10 MHz channel.

The process continues at block 908, where the base station determines that a UE's speed exceeds a threshold speed. For instance, the base station may receive from the UE an indication of the UE's speed. The base station may then compare that indication to a predetermined threshold speed (e.g., 25 feet per second) to determine whether the indication of the UE's speed exceeds the threshold speed. Other ways of determining whether a UE's speed exceeds a threshold speed are possible as well.

Finally, at block 910, in response to determining that there are greater than the threshold number of other base stations that operate on the first frequency channel, the base station instructs the UE to use the first frequency channel, even though the base station determined that the UE's speed exceeds the threshold speed. As described above, the base station may transmit to the UE on an overhead downlink channel a frequency assignment message that specifies the first frequency channel. In response to receiving such a message, the UE may engage in registration signaling with the base station in order to register for service on the first channel.

5. Conclusion

Various embodiments have been described above. Those skilled in the art will understand, however, that changes and modifications may be made to these embodiments without departing from the scope of the claims.

We claim:

1. In a wireless communication system, a method comprising:
   a base station providing wireless service to a user equipment device (UE), wherein the base station is configured to provide service on a plurality of frequency channels, and wherein the plurality of frequency channels includes a first frequency channel having a first bandwidth and a second frequency channel having a second bandwidth that is narrower than the first bandwidth;
   the base station determining that the UE's speed exceeds a threshold speed; and
   in response to the determining, and based on the second bandwidth of the second frequency channel being narrower than the first bandwidth of the first frequency channel, the base station instructing the UE to use the second frequency channel instead of the first frequency channel.

2. The method of claim 1, wherein the base station determining that a UE's speed exceeds a threshold speed comprises:
   the base station receiving from the UE an indication of the UE's speed; and
   the base station determining that the indicated speed exceeds a predetermined threshold speed.

3. The method of claim 1, further comprising:
  the base station receiving from one or more other base stations an indication of the frequency channels on which the one or more other base stations operate;
  based on the indications of the frequency channels on which the one or more other base stations operate, the base station determining that there are fewer than a threshold number of other base stations that operate on the first frequency channel,
  wherein the base station instructs the UE to use the second frequency channel in response to determining (i) that the UE's speed exceeds the threshold speed and (ii) that there are fewer than a threshold number of other base stations that operate on the first frequency channel.

4. The method of claim 3, further comprising:
  the base station determining a threshold distance based on the UE's speed; and
  the base station transmitting frequency-channel queries to the one or more other base stations located within the threshold distance,
  wherein, in response to the transmitting, the base station receives from the one or more other base stations an indication of the frequency channels on which the one or more other base stations operate.

5. The method of claim 1,
  wherein the base station further provides service on a third frequency channel having a third bandwidth that is narrower than the second bandwidth, and
  wherein the base station determining that the UE's speed exceeds the threshold speed comprises the base station determining that the UE's speed exceeds a first threshold speed but does not exceed a second threshold speed.

6. The method of claim 1, wherein the base station provides wireless service on a plurality of frequency bands, wherein the plurality of frequency bands defines the plurality of frequency channels, and wherein the plurality of frequency bands includes a first frequency band that is centered about a first frequency and a second frequency band that is centered about a second frequency, the second frequency being lower than the first frequency, wherein the method further comprises:
  in response to determining that the UE's speed exceeds the threshold speed, the base station instructing the UE to use the second frequency band, wherein the second frequency band defines the second frequency channel.

7. In a wireless communication system, a method comprising:
  a base station providing wireless service to a user equipment device (UE), wherein the base station is configured to provide service on a plurality of frequency channels, and wherein the plurality of frequency channels includes a first frequency channel having a first bandwidth and a second frequency channel having a second bandwidth that is narrower than the first bandwidth;
  the base station receiving from one or more other base stations an indication of the frequency channels on which the one or more other base stations operate;
  based on the indications of the frequency channels on which the one or more other base stations operate, the base station determining that there are greater than a threshold number of other base stations that operate on the first frequency channel;
  the base station determining that the UE's speed exceeds a threshold speed; and
  in response to the determining, the base station instructing the UE to use the first frequency channel even though the base station determined that the UE's speed exceeds the threshold speed.

8. The method of claim 7, wherein the base station determining that a UE's speed exceeds a threshold speed comprises:
  the base station receiving from the UE an indication of the UE's speed; and
  the base station determining that the indicated speed exceeds a predetermined threshold speed.

9. The method of claim 7, further comprising:
  the base station determining a threshold distance based on the UE's speed; and
  the base station transmitting frequency-channel queries to the one or more other base stations located within the threshold distance,
  wherein, in response to the transmitting, the base station receives from the one or more other base stations an indication of the frequency channels on which the one or more other base stations operate.

10. The method of claim 7,
  wherein the base station further provides service on a third frequency channel having a third bandwidth that is wider than the first bandwidth, and
  wherein the base station determining that the UE's speed exceeds the threshold speed comprises the base station determining that the UE's speed exceeds a first threshold speed but does not exceed a second threshold speed.

11. The method of claim 7, wherein the base station provides wireless service on a plurality of frequency bands, wherein the plurality of frequency bands defines the plurality of frequency channels, and wherein the plurality of frequency bands includes a first frequency band that is centered about a first frequency and a second frequency band that is centered about a second frequency, the second frequency being lower than the first frequency, wherein the method further comprises:
  in response to determining that the UE's speed exceeds the threshold speed, the base station instructing the UE to use the second frequency band, wherein the second frequency band defines the first frequency channel.

12. A radio access network (RAN) base station arranged to provide wireless service to user equipment devices (UEs) on a plurality of frequency channels, wherein the plurality of frequency channels includes a first frequency channel having a first bandwidth and a second frequency channel having a second bandwidth that is narrower than the first bandwidth, the base station comprising:
  a non-transitory computer readable medium (CRM);
  at least one processor; and
  instructions stored on the CRM and executable by the at least one processor for carrying out functions including:
    the base station determining that a UE's speed exceeds a threshold speed; and
    in response to the determining, and based on the second bandwidth of the second frequency channel being narrower than the first bandwidth of the first frequency channel, the base station instructing the UE to use the second frequency channel instead of the first frequency channel.

13. The base station of claim 12, wherein the base station determining that a UE's speed exceeds a threshold speed comprises:
  the base station receiving from the UE an indication of the UE's speed; and the base station determining that the indicated speed exceeds a predetermined threshold speed.

14. The base station of claim 12, wherein the functions further comprise:
the base station receiving from one or more other base stations an indication of the frequency channels on which the one or more other base stations operate;
based on the indications of the frequency channels on which the one or more other base stations operate, the base station determining that there are less than a threshold number of other base stations that operate on the first frequency channel,
wherein the base station instructs the UE to use the second frequency channel in response to determining (i) that the UE's speed exceeds the threshold speed and (ii) that there are less than a threshold number of other base stations that operate on the first frequency channel.

15. The base station of claim 14, wherein the functions further comprise:
the base station determining a threshold distance based on the UE's speed; and
the base station transmitting frequency-channel queries to the one or more other base stations located within the threshold distance,
wherein, in response to the transmitting, the base station receives from the one or more other base stations an indication of the frequency channels on which the one or more other base stations operate.

16. The base station of claim 12, wherein the functions further comprise:
the base station receiving from one or more other base stations an indication of the frequency channels on which the one or more other base stations operate;
based on the indications of the frequency channels on which the one or more other base stations operate, the base station determining that there are greater than a threshold number of other base stations that operate on the first frequency channel;
the base station determining that a second UE's speed exceeds the threshold speed; and
in response to the determining, the base station instructing the second UE to use the first frequency channel even though the base station determined that the second UE's speed exceeds the threshold speed.

17. The base station of claim 16, wherein the functions further comprise:
the base station determining a threshold distance based on the UE's speed; and
the base station transmitting frequency-channel queries to the one or more other base stations located within the threshold distance,
wherein, in response to the transmitting, the base station receives from the one or more other base stations an indication of the frequency channels on which the one or more other base stations operate.

18. The base station of claim 12,
wherein the base station further provides service on a third frequency channel having a third bandwidth that is narrower than the second bandwidth, and
wherein the base station determining that the UE's speed exceeds a threshold speed comprises the base station determining that the UE's speed exceeds a first threshold speed but does not exceed a second threshold speed.

19. The base station of claim 12, wherein the base station provides wireless service on a plurality of frequency bands, with each frequency band defining the plurality of frequency channels, wherein the plurality of frequency bands includes a first frequency band that is centered about a first frequency and a second frequency band that is centered about a second frequency, the second frequency being lower than the first frequency, wherein the functions further comprise:
in response to determining that the UE's speed exceeds the threshold speed, the base station instructing the UE to use the second frequency band, wherein the second frequency band defines the second frequency channel.

20. The base station of claim 19,
wherein the base station further provides service on a third frequency band that is centered about a third frequency, the third frequency being lower than the first frequency, and
wherein the base station determining that the UE's speed exceeds a threshold speed comprises the base station determining that the UE's speed exceeds a first threshold speed but does not exceed a second threshold speed.

* * * * *